United States Patent
Shen et al.

(10) Patent No.: US 10,802,918 B2
(45) Date of Patent: Oct. 13, 2020

(54) COMPUTER DEVICE, SERVER DEVICE, AND METHOD FOR CONTROLLING HYBRID MEMORY UNIT THEREOF

(71) Applicant: MITAC COMPUTING TECHNOLOGY CORPORATION, Taoyuan (TW)

(72) Inventors: Wei-Lung Shen, Taoyuan (TW); Chen-Nan Hsiao, Taoyuan (TW); Chih-Cheng Wang, Taoyuan (TW); Chung-Huang Liu, Taoyuan (TW)

(73) Assignee: MITAC COMPUTING TECHNOLOGY CORPORATION., Taoyuan (TW)

( * ) Notice: Subject to any disclaimer, the term of this patent is extended or adjusted under 35 U.S.C. 154(b) by 49 days.

(21) Appl. No.: 16/244,639

(22) Filed: Jan. 10, 2019

(65) Prior Publication Data
US 2019/0286527 A1    Sep. 19, 2019

(30) Foreign Application Priority Data

Mar. 14, 2018    (TW) .............................. 107108723 A

(51) Int. Cl.
*G06F 3/06* (2006.01)
*G06F 11/14* (2006.01)

(52) U.S. Cl.
CPC .......... *G06F 11/1441* (2013.01); *G06F 3/068* (2013.01); *G06F 3/0614* (2013.01); *G06F 3/0647* (2013.01)

(58) Field of Classification Search
CPC .. G06F 11/1441; G06F 9/4406; G06F 3/0614; G06F 3/0647; G06F 3/068
USPC .......................................................... 711/165
See application file for complete search history.

(56) References Cited

U.S. PATENT DOCUMENTS

| 2003/0149867 | A1* | 8/2003 | Park ......................... G06F 1/24 713/1 |
| 2014/0289570 | A1* | 9/2014 | Lewis ................. G06F 11/3089 714/43 |
| 2014/0317612 | A1 | 10/2014 | Ayanam et al. |
| 2016/0118121 | A1* | 4/2016 | Kelly ................. G11C 14/0018 710/301 |
| 2017/0249248 | A1* | 8/2017 | Nguyen ................ G06F 3/0685 |
| 2017/0286285 | A1 | 10/2017 | Berke et al. |

(Continued)

FOREIGN PATENT DOCUMENTS

| CN | 105739656 A | 7/2016 |
| CN | 106852175 A | 6/2017 |

(Continued)

*Primary Examiner* — Hashem Farrokh
(74) *Attorney, Agent, or Firm* — Rabin & Berdo, P.C.

(57) ABSTRACT

A computer device, a server device, and a method for controlling a hybrid memory unit thereof are provided. The control method includes: executing, by a processing unit, an operating system (OS) in a working mode of the computer device; triggering, by a soft off control signal or a soft reset control signal when the processing unit executes the OS, the processing unit to enter an interrupt processing mode; executing, by the processing unit, basic input/output system (BIOS) program code in the interrupt processing mode; and controlling, by the processing unit by using the BIOS program code, to store data from a volatile memory into a non-volatile memory corresponding to the volatile memory.

15 Claims, 4 Drawing Sheets

(56) References Cited

U.S. PATENT DOCUMENTS

2018/0107596 A1* 4/2018 Kelly .................. G06F 11/0751
2018/0165101 A1* 6/2018 Bulusu ................ G06F 11/1417

FOREIGN PATENT DOCUMENTS

| TW | 200511120 A | 3/2005 |
| TW | 201430853 A | 8/2014 |
| TW | 201732612 A | 9/2017 |

* cited by examiner

COMPUTER DEVICE, SERVER DEVICE, AND METHOD FOR CONTROLLING HYBRID MEMORY UNIT THEREOF

CROSS-REFERENCE TO RELATED APPLICATION

This non-provisional application claims priority under 35 U.S.C. § 119(a) to Patent Application No. 107108723 filed in Taiwan, R.O.C. on Mar. 14, 2018, the entire contents of which are hereby incorporated by reference.

BACKGROUND

Technical Field

The present invention relates to a computer device and a server device, and particularly, to a computer device having a hybrid memory unit, and a server device.

Related Art

Existing memories applied to computers are mainly classified into two categories, namely, a dynamic random access memory (DRAM) and a storage memory. The DRAM has an advantage of a fast read and write speed. However, data stored in the DRAM is lost after a computer is powered off. The storage memory has a slow read and write speed, and the read and write speed is about one thousandth of the read and write speed of the DRAM. However, data stored in the storage memory is not lost when the computer is powered off. The DRAM and the storage memory have different advantages and disadvantages.

A hybrid memory has been developed currently, and has advantages of the DRAM and the storage memory. In other words, the hybrid memory has a fast read and write speed and data stored in the hybrid memory is not lost when a computer is powered off.

SUMMARY

In view of this, the present invention provides a computer device, a server device, and a method for controlling a hybrid memory unit thereof.

In an embodiment, a computer device includes a hybrid memory unit, a basic input/output system (BIOS) memory unit, and a processing unit. The hybrid memory unit includes a volatile memory and a non-volatile memory. The BIOS memory unit stores BIOS program code, where the BIOS program code includes sub-program code used to control the hybrid memory unit. The processing unit is coupled to the hybrid memory unit and the BIOS memory unit, where the processing unit is configured to execute an operating system (OS) in a working mode of the computer device, and enter an interrupt processing mode according to a soft off control signal or a soft reset control signal when executing the OS, and the processing unit executes the BIOS program code in the interrupt processing mode, and controls the hybrid memory unit to store, into the non-volatile memory, data stored in the volatile memory.

In an embodiment, a server device includes a hybrid memory unit, a BIOS memory unit, a processing unit, and a baseboard management controller (BMC). The hybrid memory unit includes a volatile memory and a non-volatile memory. The BIOS memory unit stores BIOS program code, where the BIOS program code includes sub-program code used to control the hybrid memory unit. The processing unit is coupled to the hybrid memory unit and the BIOS memory unit, where the processing unit is configured to execute the BIOS program code in an interrupt processing mode, and control the hybrid memory unit to store, into the non-volatile memory, data stored in the volatile memory. The baseboard management controller is coupled to the processing unit, and the BMC is configured to trigger, according to a hard reset signal, the processing unit to enter the interrupt processing mode.

In an embodiment, a method for controlling a hybrid memory unit is applicable to a computer device and includes: executing, by a processing unit, an OS in a working mode of the computer device; triggering, by a soft off control signal or a soft reset control signal when the processing unit executes the OS, the processing unit to enter an interrupt processing mode; executing, by the processing unit, BIOS program code in the interrupt processing mode; and controlling, by the processing unit by using the BIOS program code, to store data from a volatile memory into a non-volatile memory corresponding to the volatile memory.

In an embodiment, a method for controlling a hybrid memory unit is applicable to a server device and includes: determining, by a BMC, whether a hard reset signal is received; if yes, triggering, by the BMC according to the hard reset signal, a processing unit to enter an interrupt processing mode; executing, by the processing unit, BIOS program code in the interrupt processing mode; and controlling, by the processing unit by using the BIOS program code, to store data from a volatile memory into a non-volatile memory corresponding to the volatile memory.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
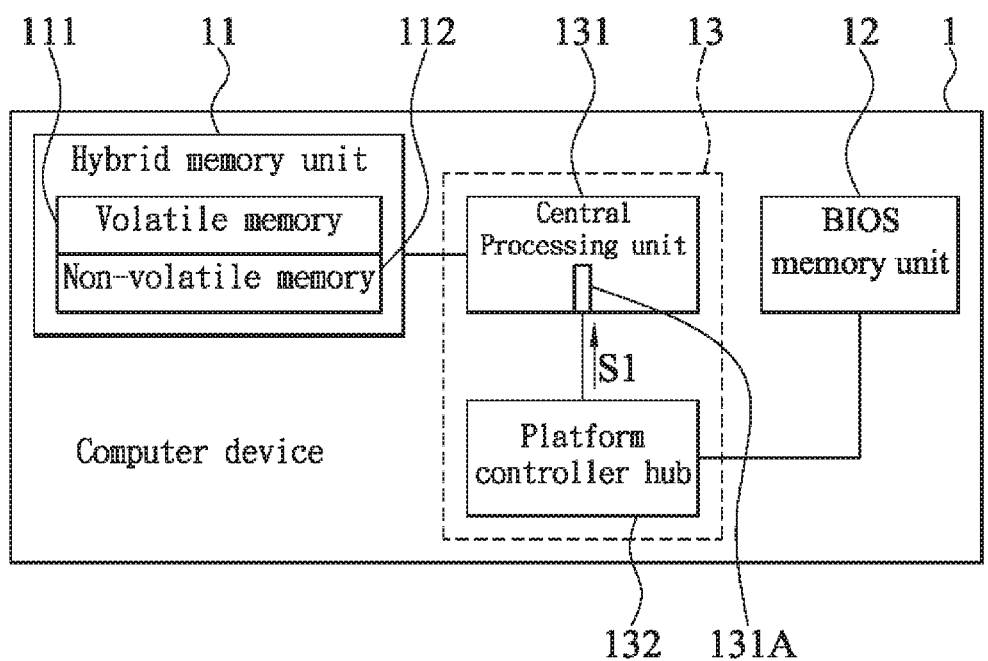
FIG. 1 is a schematic block diagram of a first embodiment of a computer device according to the present invention.
Figure 2:
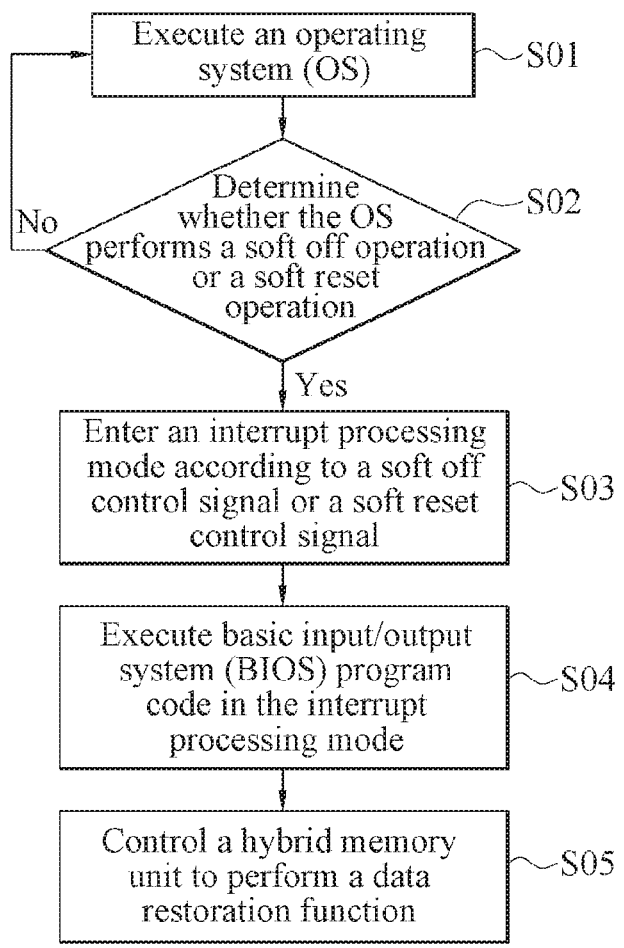
FIG. 2 is a flowchart of a first embodiment of a method for controlling a hybrid memory unit according to the present invention.

FIG. 1 is a schematic block diagram of a first embodiment of a computer device according to the present invention. FIG. 2 is a flowchart of a first embodiment of a method for controlling a hybrid memory unit according to the present invention. Referring to FIG. 1, the computer device 1 includes a hybrid memory unit 11, a BIOS memory unit 12, and a processing unit 13. The processing unit 13 is coupled to the hybrid memory unit 11 and the BIOS memory unit 12. The processing unit 13 can access the hybrid memory unit 11 and the BIOS memory unit 12.

The hybrid memory unit 11 includes a volatile memory 111 and a non-volatile memory 112. The hybrid memory unit 11 can temporarily store data into the volatile memory 111 or permanently store data into the non-volatile memory 112. In addition, the hybrid memory unit 11 has a data restoration function. The hybrid memory unit 11 can store data in the volatile memory 111 into the non-volatile memory 113, so that the data stored in the non-volatile memory 112 is not lost when the computer device 1 is powered off.

The BIOS memory unit 12 stores BIOS program code, the BIOS program code includes sub-program code used to control the hybrid memory unit 11, and the BIOS program code can control the hybrid memory unit 11 to perform the data restoration function.

From the perspective of running, referring to FIG. 1 and FIG. 2, the processing unit 13 first executes an OS in a working mode of the computer device 1. In this case, the OS has a right to control the computer device 1. Subsequently, when the processing unit 13 executes the OS, the processing unit 13 determines whether the OS performs a soft off operation or a soft reset operation (step S02); if yes, the processing unit 13 enters an interrupt processing mode according to a soft off control signal corresponding to the soft off operation or a soft reset control signal corresponding to the soft reset operation (step S03), that is, the processing unit 13 is triggered by the soft off control signal or the soft reset control signal to enter the interrupt processing mode; the processing unit 13 executes the BIOS program code in the interrupt processing mode (step S04). In this case, the control right for the computer device 1 is transferred from the OS to the BIOS program code. The processing unit 13 controls, by using the sub-program code used to control the hybrid memory unit 11 in the BIOS program code, the hybrid memory unit 11 to perform the data restoration function (step S05), so that the hybrid memory unit 11 stores the data in the volatile memory 111 into the non-volatile memory 112. Based on this, the data originally stored in the volatile memory 111 is not lost when the computer device 1 switches from the working mode to a soft off mode according to the soft off control signal and is not lost when the configurations of the computer device 1 are reset according to the soft reset control signal.

In an embodiment, the working mode and the soft off mode of the computer device 1 may be respectively a working (G0 Working) mode and a soft off (G2/S5 Soft off) mode stipulated in the advanced configuration and power interface (ACPI) specification.

In an embodiment, the hybrid memory unit 11 may be a non-volatile dual in-line memory module (NVDIMM), and the volatile memory 111 and the non-volatile memory 112 may be respectively a DRAM and an NAND flash memory. Moreover, the data stored in the volatile memory 111 may be data temporarily stored by a program running in the OS, for example, multimedia video data. Further, the computer device 1 may include a capacitor unit (not shown in the figure) configured to independently supply power to the hybrid memory unit 11. The capacitor unit may supply power to the hybrid memory unit 11 after a power supply unit of the computer device 1 stops power supply, so that the hybrid memory unit 11 can continue to perform the data restoration function after the power supply unit stops power supply.

In an embodiment, as shown in FIG. 1, the processing unit 13 includes a central processing unit 131 and a platform controller hub (PCH) 132. In step S03, when the OS is executed, the central processing unit 131 fills a default value into a buffer (for the convenience of description, a buffer corresponding to the soft off control signal is referred to as a first buffer and a buffer corresponding to the soft reset control signal is referred to as a second buffer below) corresponding to the PCH 132 according to the soft off control signal or the soft reset control signal. During running, the PCH 132 determines whether a value in each buffer is changed to the default value. When the PCH 132 determines that a value in ether the first buffer or the second buffer is changed to the default value, in step S03, the PCH 132 sends a system management interrupt (SMI) signal S1, the central processing unit 131 has an SMI control pin 131A, the SMI control pin 131A of the central processing unit 131 receives the SMI signal S1, the central processing unit 131 enters a system management mode (SMM) under triggering of the SMI signal S1, and further, executes the BIOS program code in the SMM, and controls the hybrid memory unit 11 to perform the data restoration function.

Figure 3:
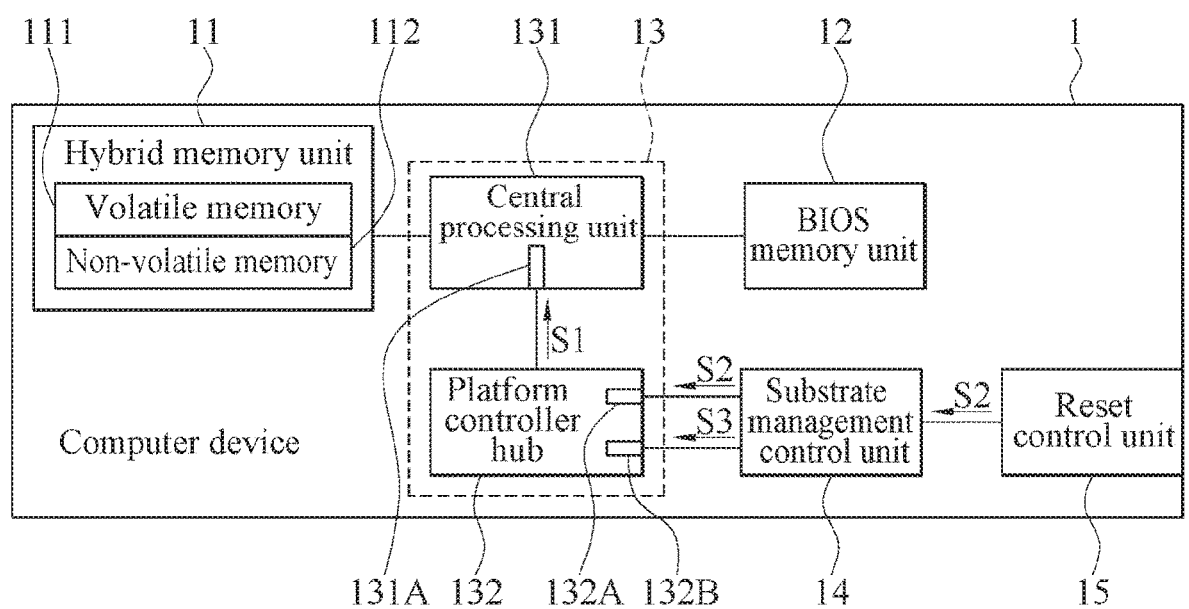
FIG. 3 is a schematic block diagram of a second embodiment of a computer device according to the present invention.
Figure 4:
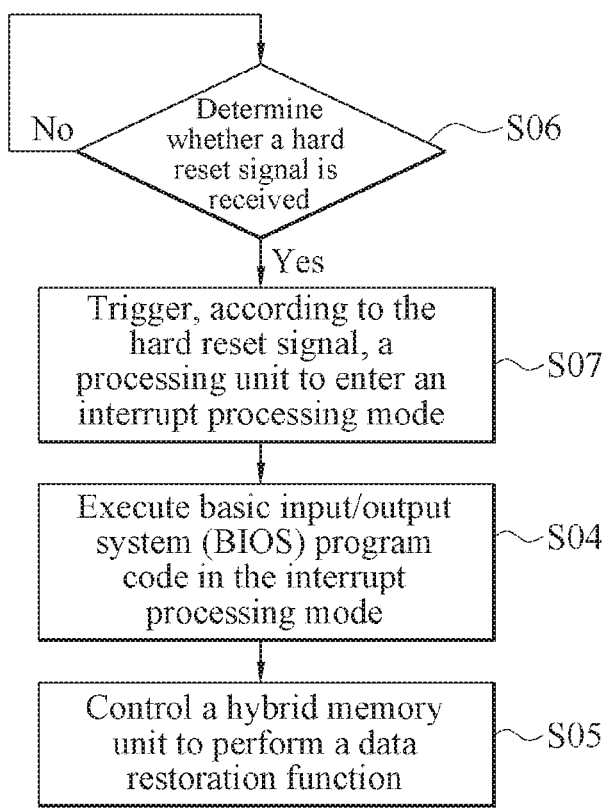
FIG. 4 is a flowchart of a second embodiment of a method for controlling a hybrid memory unit according to the present invention.

FIG. 3 is a schematic block diagram of a second embodiment of a computer device according to the present invention. Referring to FIG. 3, the computer device 1 in FIG. 3 is a server, and the computer device 1 further includes a BMC 14. During running, referring to FIG. 3 and FIG. 4, FIG. 4 is a flowchart of a second embodiment of a method for controlling a hybrid memory unit according to the present invention. During running, the BMC 14 determines whether a hard reset signal S2 is received (step S06); if yes, the BMC 14 triggers, according to the hard reset signal S2, the processing unit 13 to enter the interrupt processing mode (step S07). The processing unit 13 executes the BIOS program code in the interrupt processing mode (step S04), and controls the hybrid memory unit 11 to perform the restoration function (step S05). Therefore, data originally stored in the volatile memory 111 of the hybrid memory unit 11 is not lost when the computer device 1 is reset according to the hard reset signal S2.

In an embodiment, as shown in FIG. 3, the computer device 1 further includes a reset control unit 15, and the BMC 14 is coupled between the PCH 132 and the reset control unit 15. The reset control unit 15 may be an entity button, and the reset control unit 15 can drive, when pressed by a user of the computer device 1, the computer device 1 to be reset. Therefore, in step S06, during running, the BMC 14 determines whether the reset control unit 15 is pressed by the user and generates the hard reset signal S2; if yes, in step S07, the BMC 14 triggers, according to the hard reset signal S2 from the reset control unit 15, the processing unit 13 to enter the interrupt processing mode. In another embodiment, in step S06, the BMC 14 may further determine whether a reset instruction from a remote device is received through a network, or determine whether a reset instruction that is generated by the processing unit 13 according to a software program when the processing unit executes the OS is received; if yes, in step S07, the BMC 14 triggers, according to the received reset instruction, the processing unit 13 to enter the interrupt processing mode. Specifically, the BMC 14 generates the hard reset signal S2 according to the received reset instruction, and then, sends the hard reset signal S2 to the PCH 132 through a reset control pin 132A of the PCH 132, so that the PCH 132 controls, according to the hard reset signal S2, the computer device 1 to be reset.

In an embodiment, the PCH 132 includes the reset control pin 132A and an interrupt trigger pin 132B, and the BMC 14 is coupled between the reset control pin 132A and the interrupt trigger pin 132B of the PCH 132. When the reset control unit 15 generates the hard reset signal S2, in step S07, the BMC 14 sends an interrupt signal S3 to the PCH 132 through the interrupt trigger pin 132B of the PCH 132, so that the PCH 132 sends the SMI signal S1 according to the interrupt signal S3 and triggers the central processing unit 131 to enter the interrupt processing mode. After sending the interrupt signal S3, the BMC 14 sends the hard reset signal S2 to the PCH 132 through the reset control pin 132A of the PCH 132, so that the PCH 132 controls, according to the hard reset signal S2, the computer device 1 to be reset.

To sum up, according to the embodiments of the computer device, the server device, and the method for controlling a hybrid memory unit thereof, the hybrid memory unit can perform the data restoration function before the computer device switches to the soft off mode or the computer device is reset, so that data stored in the volatile memory of the hybrid memory unit is not lost when the computer device switches to the soft off mode or is reset.

What is claimed is:

1. A computer device, comprising:
a hybrid memory unit, comprising a volatile memory and a non-volatile memory;
a basic input/output system (BIOS) memory unit, storing BIOS program code, wherein the BIOS program code comprises sub-program code used to control the hybrid memory unit; and
a processing unit, coupled to the hybrid memory unit and the BIOS memory unit, the processing unit comprising a central processing unit and a platform controller hub (PCH), wherein
the central processing unit is configured to
execute an operating system (OS) in a working mode of the computer device, and
fill, according to a soft off control signal or a soft reset control signal, a default value into a buffer of the PCH corresponding to the soft off control signal or the soft reset control signal, to trigger the PCH to control the central processing unit to enter an interrupt processing mode, and
the central processing unit
executes the BIOS program code in the interrupt processing mode, and
controls the hybrid memory unit to store, into the non-volatile memory, data stored in the volatile memory.

2. The computer device according to claim 1, further comprising a baseboard management controller (BMC), wherein the BMC triggers, according to a hard reset signal, the PCH to control the central processing unit to enter the interrupt processing mode, so that the central processing unit executes the BIOS program code and controls the hybrid memory unit to store, into the non-volatile memory, the data stored in the volatile memory.

3. The computer device according to claim 2, wherein the hard reset signal is from a reset control unit, and the reset control unit generates the hard reset signal according to a press action.

4. The computer device according to claim 3, wherein the BMC is coupled between the processing unit and the reset control unit.

5. The computer device according to claim 1, wherein the central processing unit comprises a system management interrupt (SMI) control pin, coupled to the PCH to receive a SMI signal sent from the PCH.

6. The computer device according to claim 1, further comprising a capacitor unit, coupled to the hybrid memory unit.

7. A server device, comprising:
a hybrid memory unit, comprising a volatile memory and a non-volatile memory;
a basic input/output system (BIOS) memory unit, storing BIOS program code, wherein the BIOS program code comprises sub-program code used to control the hybrid memory unit;
a processing unit, coupled to the hybrid memory unit and the BIOS memory unit, the processing unit comprising a central processing unit and a platform controller hub (PCH), wherein
the central processing unit is configured to executes an operating system (OS) and fills, according to a soft off control signal or a soft reset control signal, a default value into a buffer of the PCH corresponding to the soft off control signal or the soft reset control signal, to trigger the PCH to control the central processing unit to enter an interrupt processing mode, and
the central processing unit
execute the BIOS program code in the interrupt processing mode, and
control the hybrid memory unit to store, into the non-volatile memory, data stored in the volatile memory; and
a baseboard management controller (BMC), coupled to the processing unit, wherein the BMC is configured to receive a hard reset signal, and trigger, according to the hard reset signal, the PCH to control the central processing unit to enter the interrupt processing mode.

8. The server device according to claim 7, further comprising a reset control unit, configured to generate the hard reset signal according to a press action, wherein the BMC is coupled between the reset control unit and the processing unit, and the BMC receives the hard reset signal from the reset control unit.

9. The server device according to claim 7, wherein the central processing unit comprises a system management interrupt (SMI) control pin, coupled to the PCH to receive a SMI signal sent from the PCH.

10. The computer device according to claim 7, further comprising a capacitor unit, coupled to the hybrid memory unit.

11. A method for controlling a hybrid memory unit, applicable to a computer device, wherein the control method comprises:
executing, by a central processing unit of a processing unit, an operating system (OS) in a working mode of the computer device;
executing, by the central processing unit, the OS, and filling, by a soft off control signal or a soft reset control signal, a default value into a buffer of a platform controller hub (PCH) of the processing unit corresponding to the soft off control signal or the soft reset control signal;
triggering, by the PCH according to the buffer having the default value, the central processing unit to enter an interrupt processing mode;
executing, by the central processing unit, basic input/output system (BIOS) program code in the interrupt processing mode; and
controlling, by the central processing unit by using the BIOS program code, to store data from a volatile memory into a non-volatile memory corresponding to the volatile memory.

12. The method for controlling a hybrid memory unit according to claim 11, further comprising: triggering, by a baseboard management controller (BMC) according to a hard reset signal, the PCH to trigger the central processing unit to enter the interrupt processing mode, so that the central processing unit executes the BIOS program code.

13. The method for controlling a hybrid memory unit according to claim 12, wherein in the step of triggering, by the BMC according to the hard reset signal, the PCH to trigger the central processing unit to enter the interrupt processing mode, the BMC triggers, according to the hard reset signal that is generated by a reset control unit according to a press action, the PCH to trigger the central processing unit to enter the interrupt processing mode.

14. A method for controlling a hybrid memory unit, applicable to a server device, wherein the control method comprises:

executing, by a central processing unit of a processing unit, an operating system (OS) in a working mode of the server device;

executing, by the central processing unit, the OS, and filling, by a soft off control signal or a soft reset control signal, a default value into a buffer of a platform controller hub (PCH) of the processing unit corresponding to the soft off control signal or the soft reset control signal;

triggering, by the PCH according to the buffer having the default value, the central processing unit to enter an interrupt processing mode;

executing, by the central processing unit, basic input/output system (BIOS) program code in the interrupt processing mode;

controlling, by the central processing unit by using the BIOS program code, to store data from a volatile memory into a non-volatile memory corresponding to the volatile memory; and determining, by a baseboard management controller (BMC), whether a hard reset signal is received, and if yes, triggering, by the BMC according to the hard reset signal, the PCH to trigger the central processing unit to enter the interrupt processing mode.

15. The method for controlling a hybrid memory unit according to claim 14, wherein in the step of determining, by the BMC, whether the hard reset signal is received, the BMC determines whether a reset control unit generates the hard reset signal according to a press action, or the BMC determines whether the hard reset signal from a remote device is received.

\* \* \* \* \*